United States Patent [19]

Holzemann

[11] Patent Number: 4,935,137

[45] Date of Patent: Jun. 19, 1990

[54] FILTER APPARATUS FOR A LIQUID MIXTURE

[75] Inventor: Jürgen Holzemann, Rain am Lech, Fed. Rep. of Germany

[73] Assignee: Apparatebau Biersdorf Walter Kramer GmbH, Rain am Lech, Fed. Rep. of Germany

[21] Appl. No.: 343,218

[22] Filed: Apr. 26, 1989

[51] Int. Cl.$^5$ .............................................. B01D 33/21
[52] U.S. Cl. .................................... 210/334; 210/383; 210/407
[58] Field of Search ...................... 210/78 D, 314, 216, 210/297, 321.67, 321.68, 324, 330–334, 346, 347, 383, 413–415, 407, 408

[56] References Cited

U.S. PATENT DOCUMENTS 3,984,317 10/1976 Donovan .............................. 210/314
4,781,828 11/1988 Kupka ................................. 210/225

*Primary Examiner*—Frank Sever
*Attorney, Agent, or Firm*—Fleit, Jacobson, Cohn, Price, Holman & Stern

[57] ABSTRACT

Filter apparatus where two or more chambers are each provided with an inlet 23, 26, 29, 32, and outlets 25, 28, 31, 34 and means 2, 27, 30, 33, for removing substances retained in the filter. It is desirable that the filter apparatus be suitable for separating liquid components of a mixture of liquids. This is achieved in applying the filter apparatus for the separation of the liquid mixture into at least two liquid components and a watery component if the filter medium 12 to which the liquid mixture is admitted through the inlet 26 of the first chamber is selected to retain the liquid component having the largest molecular size and the means for removing the substance retained is a line 27 for this liquid component and if for the purpose of transferring the filtrate from the first chamber into the second chamber, the outlet 28 of the first chamber is connected to the inlet 29 of the second chamber whose filter medium 13 is selected to retain the liquid component having the largest molecular size in the filtrate admitted and the means for removing the substance retained in the second chamber is a line 30 for this liquid component. Based on this configuration, a conventional plate-and-frame filter press or rotor filter press can conveniently be converted for the filtration of liquid components.

8 Claims, No Drawings

FILTER APPARATUS FOR A LIQUID MIXTURE

DESCRIPTION

This invention relates to filter apparatus for a liquid mixture wherein two or more chambers are provided in each of which there is a hollow space for the filtrate separated by a filter medium from a hollow space for the substance to be retained and which has associated with it a rotor disc provided with flow-inducing ribs as well as a hollow space for the slurry and wherein each hollow space for the slurry is provided with an inlet and each hollow space for the substance to be retained is associated with means to remove the substance retained and each hollow space for the filtrate is provided with an outlet.

Filter apparatus of this type is disclosed in the German Patent No. 34 26 527 in which a liquid mixture laden with solid particles is admitted to all chambers and the filter media of all chambers are selected to retain the solid particles. The liquid mixture is discharged from all chambers and the filter apparatus unchanged, except that the solid particles have been removed. The outlet from each chamber leads to a common discharge pipe for the liquid mixture. Each chamber is of split construction and the sections of the chamber can be moved apart in order to remove the solid filter cake formed in the process. In this filter apparatus, a liquid mixture comprising two liquid components, e.g. contaminant components, such as oil and tensides, and a watery component, passes through unchanged.

It is the object of the present invention to further develop filter apparatus of the type initially referred to so as to adapt it for the separation of liquid components of a liquid mixture. In solving this problem, the filter apparatus according to the invention is characterized in that it is used for the separation of a liquid mixture into at least two liquid components and a watery component, in that the filter medium handling the liquid mixture admitted through the inlet of the first chamber is selected to retain the liquid component having the largest molecular size and the means for removing the retained substance is a pipe for this liquid component and in that for the purpose of transferring the filtrate from the first chamber into the second chamber, the outlet of the first chamber is connected to the inlet of the second chamber whose filter medium is selected to retain the liquid component of the largest molecular size contained in the filtrate admitted and the means for removing the substance retained in the second chamber is a pipe for this liquid component.

On the strength of this invention, it is possible to retrofit conventional filter apparatus, a plate-and-frame filter press or rotor filter press, in quite a simple manner for the filtering out of liquid components, e.g. contaminant components. In the filtering apparatus known per se, filter media known per se are used to filter out in each stage the higher molecular liquid components from the other lower molecular liquid components and the watery component. Each chamber has another liquid mixture admitted to it and the filtrate discharged from each preceding chamber is the liquid mixture admitted to the subsequent chamber or the watery component with the water purity desired in the specific case. The filtering out of liquid components is repeated in a plurality of chambers as often as is necessary to produce the watery solution with the desired purity. An important factor for an economical and efficient filtration of liquid components by means of filter media matched to the molecular sizes are the rotor discs provided with flow-inducing ribs. The cross-flow effect is important also in this case where liquid components are to be retained.

Filter apparatus according to the invention can be configured and used for a liquid mixture without solid particles. It is specially desirable and advantageous if the chambers for retaining the liquid components are preceded by at least one chamber with a filter medium for retaining solid particles, the chamber being associated with means for removing a solid particle filter cake and the outlet of this chamber being connected with the inlet of the first chamber intended for retaining a liquid component. Where a liquid mixture laden with solid particles is handled, for the solid particles are removed first before the liquid components are separated from the watery component. The means for removing the solid-particle filter cake may consist, for instance, of chamber sections which can be moved apart.

If a liquid mixture contains a plurality of different liquid components which are to be filtered off, it is conceivable to accommodate the chambers in two or more units which are interconnected by a pipe. It is specially desirable and advantageous, however, if all chambers for retaining liquid components are combined in a common enclosure to form an integral unit. In other words, separation of the liquid mixture into the different liquid components is by means of only one unit, all rotor discs in the case of such a unit being as a rule mounted on a common shaft and driven by one motor.

It is conceivable that at least one chamber for retaining solid particles and chambers for retaining liquid components are accommodated in two different units which are interconnected by a pipe. It is specially desirable and advantageous, however, to have at least one chamber for retaining solid particles and chambers for retaining liquid components combined in a common enclosure to form an integral unit. Separation of the solid particles and of at least one liquid component are effected by means of only one unit in which, as already mentioned, all rotor discs are as a rule mounted on a common shaft and driven by only one motor.

An advantageous construction of the filter apparatus of the type initially referred to is provided in a manner known per se (German Patent No. 34 26 527) if two filter media are separated from each other by a hollow space for admitting the filtrate and a rotor disc having flow-inducing ribs provided on both sides is arranged between the two filter media. In this case, it is specially desirable and advantageous if the space between the two filter media is subdivided by a partition forming two segregated hollow spaces for the filtrate and a continuous seal provided on the circumference of the rotor disc separates the two hollow spaces for the substance to be retained on both sides of the rotor disc from each other. In this manner, the advantageous construction referred to is adapted to the configuration according to the invention. The two hollow spaces separated from each other by the partition and the two hollow spaces separated from each other by the rotor disc provided with a seal each receive and handle different substances. Each of the hollow spaces separated by the partition has a separate outlet and each of the hollow spaces separated by the rotor disc with the seal has a separate inlet.

In those hollow spaces where no solid-particle filter cake is deposited, there may be non-liquid residues accumulating. In view of this, it is specially desirable and advantageous if small openings which can be closed by covers are associated with the hollow spaces for the removal of non-liquid residues. Removal of the non-liquid residues through the small openings provided as a rule in the underside of the shell is by scraping out or flushing out.

In this case, removal of the liquid substance retained in the filter is not by having the shell surrounding the chambers in sections which are moved apart axially when the filter media can also be replaced. It is therefore specially desirable and advantageous if large openings capable of being closed by means of covers are allied to the filter media for replacing the filter media. These large openings and their covers or doors extend as a rule over half the circumference of the shell. As a rule, a stator supporting the filter medium is taken out and reinstalled after the filter medium has been replaced.

A preferred embodiment of the invention is illustrated in the drawing which shows a filter apparatus for a liquid mixture partly in elevation and partly sectioned.

The filter apparatus shown in the drawing is a plate-and-frame filter press or rotor filter press and constructed as a single compact unit. The filter apparatus comprises a cylindrical shell 1 which is formed by two cylindrical shell sections 2, 3 and each closed at one end by an end plate 4. Extending centrally through the enclosure formed by the shell 1 and the two end plates 4 is a shaft 5 which is drivable by a motor 6 arranged outside the enclosure and inside the enclosure carries spaced rotor discs 7 each of which is provided on both sides with radially extending flow-inducing ribs or blades 8. A seal 9 extends around the circumference of each rotor disc 7 between the disc and the shell 1 so that the rotor disc cannot be bypassed by liquid in an axial direction.

Spaced from each rotor disc 7 on both sides of each rotor disc in the enclosure is a stator 10 which permits liquid to pass almost unhindered and on which a plate-shaped filter medium is applied on the side facing the rotor disc 7. Provision is made for three like filter media 11 and three unlike filter media 12, 13, 14. The shaft 5 is made up in a manner known per se by a plurality of sections and can be pulled apart whereby the stators 10 with the filter media can be taken out through large openings 15 in the shell 1. The large openings 15 are closed by means of correspondingly large covers 16 or doors provided in the shell section 2.

Spaced from each of the two outer stators 10, there is one of the two end plates 4 and centrally between each group of two inner stators 10 there is a partition 17. Each partition 17 is rotatably, but sealingly, penetrated by the shaft 5 and prevents any fluid from passing from one side to the other side. Formed inside the enclosure are six chambers 38–43 which are delimited radially outwards by the shell 1. Inside each chamber 38–43, there is one of the stators 10 provided with one of the filter mediums, 11–14 a hollow space or cavity 18 to receive the filtrate, a hollow space or cavity 19 to retain the substance to be separated (i.e., the filtered material) and a hollow space or cavity 20 to receive the slurry. In the present embodiment, the hollow space 20 receiving the slurry or sludge and the hollow space 19 receiving the substance to be retained pass into each other without any separation. Each chamber 38, 39 and 40 is delimited at one end by a rotor 7 and, at the other end, by an end plate 4 or a partition 17.

Via a supply line 22, a pump 21 delivers a liquid mixture laden with solid particles to an inlet 23 of the (seen from the right) first three chambers 38, 39 and 40 in parallel. In the hollow space 19 for the the substance to be retained in each of these three chambers 38, 39 and 40, a solid-particle filter cake 24 is deposited. The filter cakes 24 can be removed by withdrawing the shell section 2 by means of a piston-cylinder device (which is not shown) in an axial direction. The liquid mixture purified from solid particles is discharged via outlets 25 from the three chambers 38, 39 and 40. These three outlets 25 are brought together and led to an inlet 26 of the fourth chamber 41 whose hollow space 19 receiving the substance to be retained is provided with a line 27 leading to the outside in which a valve 37 is provided. A first liquid contaminant component accumulates in the hollow space 19 and is discharged via the line 27. The liquid freed from the first contaminant component collects in the hollow space for the filtrate in the fourth chamber 41 and, from there, is discharged via an outlet 28 and delivered to an inlet 29 of the fifth chamber 42. The fifth chamber 42 is provided with a line 30 leading to the outside and provided with a valve 37 for a second liquid contaminant component and has an outlet 31 for the liquid freed from the second contaminant component. The outlet 31 is connected to an inlet 32 of the sixth chamber 48 which is provided with a line 33 leading to the outside and provided with a valve 37 for a third liquid contaminant component and which discharges more or less purified water at an outlet 34.

Each hollow space 19 for receiving the substance to be retained has allied to it a small opening 35 in the shell 1 and, specifically, in its fixed shell section 3, which opening is closed by a small cover 36 or door. The liquid mixture purified comes from a car wash installation and, initially, in chambers 38, 39 and 40 solid particles are removed which consist of sand, paint or grease. The subsequent chambers 41, 42 and 43 filter out liquid contaminant components, such as oil, gasoline, greases, salt concentrates and tensides. Suitable filter media are made by the Pal and Milipor companies. As a rule, two or more chambers of the 38, 39 and 40; and are used in parallel to retain solid particles which is dictated by the content of solid particles in the liquid mixture; however, it is also possible to use only one of the chambers 38, 39 and 40 for retaining solid particles. In practice, two stators 10 separated by a partition 17 are physically combined to form a stator device which is subdivided in the middle by a partition. The pressure of the liquid mixture supplied also acts to deliver the liquid through the inlets 26, 29 and 32. Should the pressure fail to be sufficient, small pumps would be interposed.

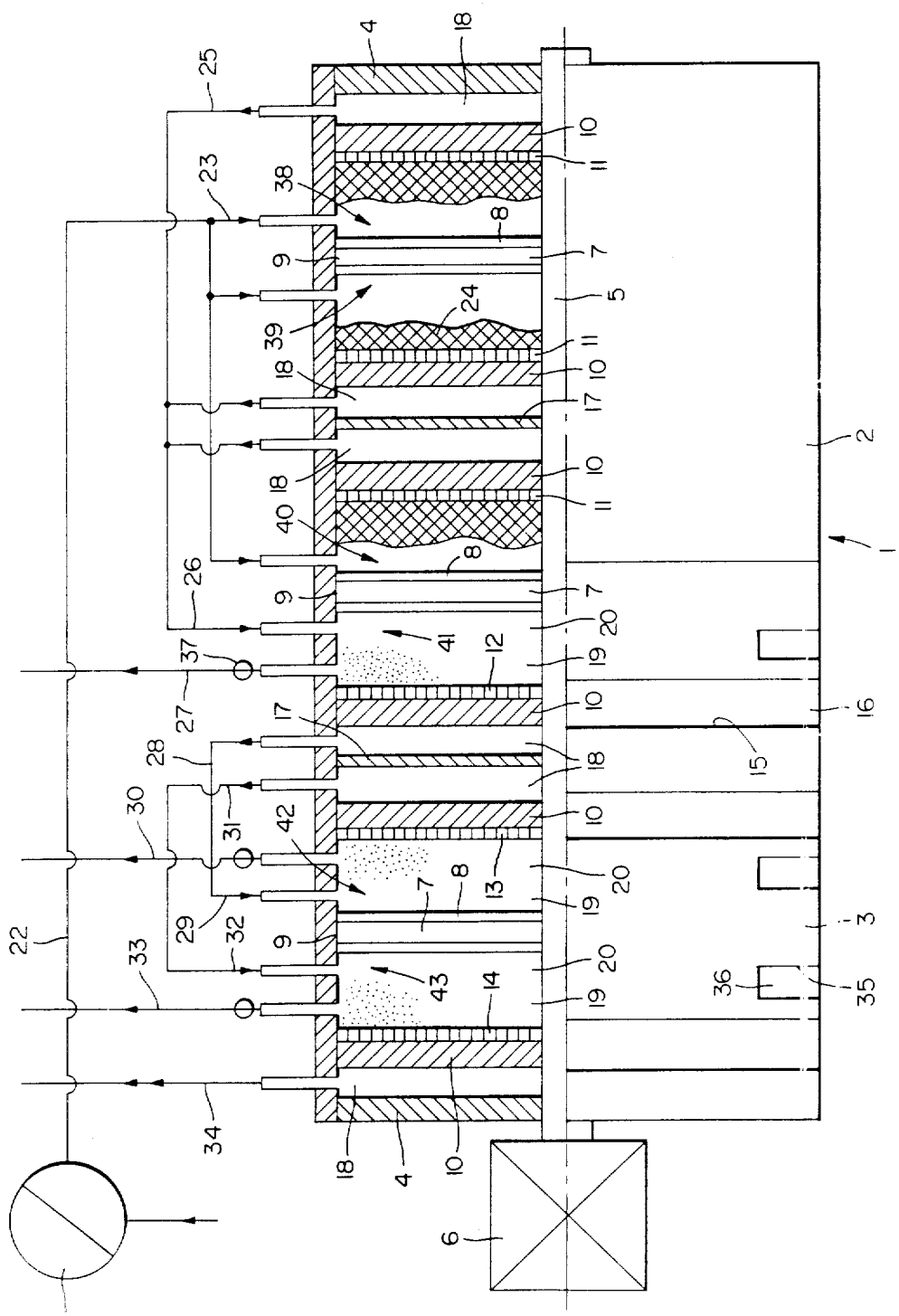

I claim:

1. A filtration device having means for enabling at least separation of a fluid mixture which includes at least two liquid partial components and one aqueous component, wherein one liquid partial component has the largest molecular size of the fluid mixture and one liquid partial component has the largest molecular size of a filtrate, the improvement comprising at least two first and second chambers, each of which has a cavity for holding a filtrate separated by a filter medium from a cavity of the chamber for holding filtered material, a rotor disc fitted with flow blades in each chamber, each chamber also including a cavity for holding sludge, with the cavity for holding sludge in the first chamber being connected to a feed inlet for the fluid mixture, a drain line for each of the chambers, and a drain line for the aqueous component, wherein:

the filter medium in the first chamber is a filter medium means for filtering out the liquid partial component with the largest molecular size of the fluid mixture;

the filter medium in the second chamber is a filter medium means for filtering out the liquid partial component with the largest molecular size of the filtrate fed from the first chamber;

the filtered material cavity of the first chamber is connected to the first chamber drain line and the filtrate cavity of the first chamber is connected to the sludge cavity of the second chamber; and the filtered material cavity of the second chamber is connected with the second chamber drain line and the filtrate cavity of the second chamber is connected to the drain for the aqueous component.

2. The filter apparatus as in claim 1, wherein the chambers for retaining the liquid components are preceded by at least one chamber with a filter medium for retaining solid particles, the at least one chamber being associated with means for removing a solid-particle filter cake and an outlet of the at least one chamber being connected with the inlet of the first chamber intended for retaining the liquid partial component with the largest molecular size of the fluid mixture.

3. The filter apparatus claim 2, wherein the at least one chamber for the retention of solid particles and the chambers for the retention of liquid components are combined in a common enclosure to form an integral unit.

4. The filter apparatus as in claim 1, wherein all of the chambers for retaining liquid components are combined in a common enclosure to form an integral unit.

5. The filter apparatus claim 1, wherein two of the filter media are separated from each other by a hollow space for the filtrate, and at least one of the rotor discs, having flow-inducing blades on both sides, is arranged between at least two of the filter media, the space between the first two filter media is subdivided by a partition into two segregated ones of the hollow cavities for the filtrate, and a seal provided on the circumference of the at least one rotor disc separates two of the cavities for holding the filtered material.

6. The filter apparatus claim 1, wherein each chamber is enclosed by a shell and the filtered material-holding cavities in the chambers have small openings associated therewith in the shell which are capable of being closed by covers, for the removal of non-liquid residues.

7. The filter apparatus claim 1, wherein each chamber is enclosed by a shell and the filter media have associated therewith large openings in the shell capable of being closed by covers in the shell, for the replacement of the filter media.

8. The filtration device as in claim 1, wherein each additional chamber includes filter means for filtering out an additional liquid partial component, the filtered material cavity of each additional chamber being connected to a respective drain line, and the filtrate cavity of the chamber, except for a last one of the chambers, being connected to the sludge cavity of the next chamber.

* * * * *

UNITED STATES PATENT AND TRADEMARK OFFICE
CERTIFICATE OF CORRECTION

PATENT NO. : 4,935,137
DATED : June 19, 1990
INVENTOR(S) : Holzemann

It is certified that error appears in the above-identified patent and that said Letters Patent is hereby corrected as shown below:

The sheet of Drawing consisting of Fig. 1, should be added as shown on the attached sheet.

Title page, second column last line after 8 claims, delete "No Drawings and add --1 Drawing--.

Signed and Sealed this

First Day of September, 1992

Attest:

DOUGLAS B. COMER

Attesting Officer

Acting Commissioner of Patents and Trademarks